(12) United States Patent
Wang et al.

(10) Patent No.: US 8,243,841 B2
(45) Date of Patent: Aug. 14, 2012

(54) SYMBOL INTERLEAVING AND CHANNEL MAPPING DEVICE AND METHOD AND MOBILE COMMUNICATION SYSTEM

(75) Inventors: Jun Wang, Beijing (CN); Jun Tian, Beijing (CN); Hiroyuki Hayashi, Beijing (CN)

(73) Assignee: Fujitsu Limited, Kawasaki (JP)

( * ) Notice: Subject to any disclaimer, the term of this patent is extended or adjusted under 35 U.S.C. 154(b) by 923 days.

(21) Appl. No.: 12/175,255

(22) Filed: Jul. 17, 2008

(65) Prior Publication Data

US 2009/0022237 A1 Jan. 22, 2009

(30) Foreign Application Priority Data

Jul. 19, 2007 (CN) .......................... 2007 1 0136164

(51) Int. Cl.
*H04B 7/02* (2006.01)
*H04L 1/02* (2006.01)
(52) U.S. Cl. ........................................................ 375/267
(58) Field of Classification Search .................. 375/267; 455/77
See application file for complete search history.

(56) References Cited

U.S. PATENT DOCUMENTS

2002/0066061 A1 5/2002 Classon et al.
2007/0298728 A1* 12/2007 Imamura et al. ................ 455/77

OTHER PUBLICATIONS

Xiaowei Jin, et al.; "The Universality of LDPC Codes on Correlated Fading Channels with Decision Feedback Based Receiver" IEEE Globecom 2005; IEEE vol. 3, Issue 28, No. -2; Dec. 2005.
Shengli Zhou, et al.; "BER Criterion and Codebook Construction for Finite-Rate Precoded Spatial Multiplexing With Linear Receivers" IEEE Transactions on Signal Processing, vol. 54, No. 5; May 2006.
Larry A. Dunning et al.; "Optimal Encodings of Linear Block Codes for Unequal Error Protection" Information and Control 37, pp. 150-177; Dated 1978.
Wil J. Van Gils; "Two Topics on Linear Unequal Error Protection Codes: Bounds on Their Length and Cyclic Code Classes"; IEEE Transactions on Information Theory, vol. IT-29, No. 6., pp. 866-876; Dated Nov. 1983.

* cited by examiner

*Primary Examiner* — David C. Payne
*Assistant Examiner* — Tanmay Shah
(74) *Attorney, Agent, or Firm* — Myers Wolin, LLC

(57) ABSTRACT

The present invention discloses a symbol interleaving and channel mapping device and method as well as a mobile communication system. The symbol interleaving and channel mapping device is used in a transmitter of a mobile communication system, said transmitter receiving the channel state information fed back from a receiver of the mobile communication system; the symbol interleaving and channel mapping device comprises a symbol classification unit for classifying symbols according to their importance; a symbol sub-carrier mapping unit for performing a sub-carrier mapping according to the classification result of said symbol classification unit and the channel state information such that the important symbols correspond to the non deep fading sub-carrier as much as possible.

10 Claims, 19 Drawing Sheets

PRIOR ART

SYMBOL INTERLEAVING AND CHANNEL MAPPING DEVICE AND METHOD AND MOBILE COMMUNICATION SYSTEM

FIELD OF THE INVENTION

The present invention relates to the technology of mobile communication systems, and more particularly to a channel mapping method and device for a multiple carrier wireless communication system, as well as to corresponding transmitter, receiver and system.

BACKGROUND OF THE RELATED ARTS

Feedback channel information in communication systems enables the transmitter to avoid interference on the basis of channel conditions. Most adaptive techniques in wireless communications are based on feedback channel information of a certain form.

A representative multiple carrier communication system is illustrated in FIGS. 1 and 2.

FIG. 1 shows a block diagram of a prior-art transmitter 100. Upper layer data is first randomized in a randomizer 101 and then coded in an FEC coder 102. The FEC coder 102 can be of any type of FEC coders. Due to the great error correction performance of CTC (convolutional Turbo codes) and irregular LDPC (low density parity-check codes), these two kinds of channel coding are widely employed. Coded data is subsequently interleaved by a bit-interleaver 103 which can be either a block interleaver or a convolutional interleaver. A modulator 104 maps the interleaved codewords to constellation symbols.

These symbols are mapped by a sub-carrier mapping unit 105 to each sub-carrier according to a predetermined rule. This process can be regarded as mapping data on a time axis to a two-dimensional space of time and frequency. In most systems, logical mapping is different from physical mapping, so as to make sure that adjacent symbols are not mapped to adjacent sub-carriers, to thereby avoid burst fading. The mapped data is then processed by means of a serial/parallel (S/P) converting unit 106, an inversed fast Fourier transformation (IFFT) unit 107, a parallel/serial (P/S) converting unit 108, and a prefix (CP) adding unit 109. These units are basic modules commonly used in the multiple carrier transmission mode orthogonal frequency division multiplexing (OFDM), and are hence not redundantly described here.

FIG. 2 shows a block diagram of a prior-art receiver 200. A received signal is first processed by means of a prefix removing unit 201, a serial/parallel converting unit 202, a fast Fourier transformation (FFT) unit 203, and a parallel/serial converting unit 204. These units are the reversed operation units of the aforementioned units 106, 107, 108 and 109, and are basic demodulating modules of OFDM publicly known to persons skilled in the art, and are therefore not redundantly described here. The function of a sub-carrier de-mapping unit 205 is contrary to the function of the sub-carrier mapping unit 105, as it maps two-dimensional data of time and frequency to a time axis. Constellation symbols are demodulated into bit blocks in a demodulator 206, and then de-interleaved in a de-interleaver 207. The de-interleaved bit blocks (namely FEC coded blocks) are decoded in an FEC decoder 208. The output is subsequently de-randomized in a de-randomizer 209 and provided to the upper layers.

For both convolutional turbo code and low density parity-check code, the codeword length is usually designed to be very long, and this is so because higher randomacity of a long codeword improves the error correction performance.

FIG. 3 is a general view of an encoder 102 with a ½ code rate convolutional turbo code. As shown in FIG. 3, input information bits are divided into 3 streams. The first bit stream goes directly into a multiplexer 305 after having been delayed by a delaying means 301a, and this portion of the codeword is usually called information bits 307. The second bit stream is processed by a ½ constituent convolutional encoder 302a after having been delayed by a delaying means 301b, to obtain the check bits of this constituent encoder. The third bit stream is first interleaved by a CTC interleaver 303, and then encoded by another ½ constituent convolutional encoder 302b to obtain its check bits. The outputs of the encoders 302a and 302b are alternatively chosen by a redundancy deletion matrix unit 304. The outputs of the redundancy deletion matrix unit 304 and the delaying means 301a are multiplexed by the multiplexer 305. As can be seen, convolutional turbo code 306 is composed of information bits 307 and check bits 308. For the convolutional turbo code, the information bits are not performed with any redundancy deletion and protection, which means the information bits part of the codeword plays a more important role than the check bits part, and should hence be additionally protected.

FIG. 4 is a general view of a check matrix of an irregular low density parity-check (LDPC) code. The characteristic of an irregular LDPC code is that the degrees of variable nodes and check nodes are not totally the same. The variable nodes' degree (column weight 404 of a check matrix 401) decides the importance of each bit in a corresponding codeword: greater is more important. That is to say, bits of the part 403 are more important than bits of the part 402 in the codeword.

The CTC code in FIG. 3 and the irregular LDPC code in FIG. 4 share a common characteristic: some bits in a codeword are more important than other bits. We call this kind of FEC code the unequal error protection (UEP) code. Besides the two error correction codes mentioned above, the convolutional code and some linear codes also belong to the UEP codes.

In a multiple carrier wireless communication system, after the data has been encoded based on the UEP code, the bits in one encoded block may be mapped to several sub-carriers after modulation. These sub-carriers usually suffer from fading of differing degrees. The conventional method against fading in the field of encoding is bit-interleaving. All the encoded bits are randomly mapped to different sub-carriers through a bit-interleaver. The probability of deep fading suffered by each bit is the same. In the circumstance the transmitter has grasped the channel fading information through feedback technologies, the conventional transmitter does not provide additional protection for specially important bits.

FIG. 5 illustrates such a circumstance. FIG. 5 is a flowchart showing the channel encoding process at a conventional transmitter side. As shown in FIG. 5, the channel encoding process at a conventional transmitter side includes: forward error correction (FEC) encoding, bit-interleaving, modulating and channel mapping. This process is consistent with the processing flow of the device shown in FIG. 1.

As shown in FIG. 5, UEP channel code (namely the FEC code 505 in FIG. 5) is first inputted in Step 501. The FEC code 505 is an unequal protection (UEP) forward correction code. The length of the code is 36 in the exemplary embodiment. The bits from 9 to 16 and from 29 to 36 are important bits (which are indicated above by the numeral 2, as shown by the reference numeral 510). The bits from 1 to 8 and from 17 to 25 are unimportant bits (which are indicated above by the numeral 1, as shown by the reference numeral 509). The FEC code 505 can be obtained by the FEC unit 102. The FEC code 505 is first interleaved by the bit-interleaver 103 (in Step 502)

to obtain a bit-interleaved code 506. The bit-interleaved code 506 is then modulated by the modulator 104 (in Step 503) into 16 QAM constellation symbols 507. After channel mapping (in Step 504) by the sub-carrier mapping unit 105, the constellation symbols 507 are to be transmitted like symbols 508. Reference numerals 511 and 512 show the channel fading intensity (channel state information) of each sub-carrier. Reference numerals 514 and 515 show the importance of each symbol. In the example as shown in FIG. 5, there are altogether 10 important bits that suffer deep fading. As a matter of fact, now that the channel information is known to the transmitting side, there should be corresponding measures to prevent the important bits from suffering deep fading.

SUMMARY OF THE INVENTION

The present invention is proposed in view of the above problems and aims to remove one or more problems present in the prior arts.

According to the first aspect of the present invention, there is provided a symbol interleaving and channel mapping device, used in a transmitter of a mobile communication system, said transmitter receiving the channel state information (CSI) fed back from a receiver of the mobile communication system; the symbol interleaving and channel mapping device comprises a symbol classification unit for classifying symbols according to their importance; a symbol sub-carrier mapping unit for performing a sub-carrier mapping according to the classification result of said symbol classification unit and the CSI such that the important symbols correspond to the non deep fading sub-carrier as much as possible.

According to the second aspect of the present invention, the symbol sub-carrier mapping unit comprises a sub-carrier mapping unit for mapping said symbols to a sub-carrier; a symbol interleaving unit for adjusting the mapping result of said sub-carrier mapping unit according to the classification result of said symbol classification unit and the CSI, such that the important symbols correspond to the non deep fading sub-carrier as much as possible.

According to the third aspect of the present invention which is based on the second aspect, the symbol interleaving and channel mapping device further comprises a symbol interleaving necessity judging unit for judging whether it is necessary to adjust the mapping result of said sub-carrier mapping unit according to the conditions of said sub-carrier and the mapping result of said sub-carrier mapping unit.

According to the fourth aspect of the present invention which is based on the second aspect, the sub-carrier is divided into a plurality of subsets in said CSI; the symbol interleaving and channel mapping device further comprises a symbol subset dividing unit, wherein the symbol subset dividing unit divides said symbols into a plurality of subsets in the same number as that of said sub-carrier; and said symbol interleaving unit adjusts the mapping result of said sub-carrier mapping unit in respect to the subsets of said symbols.

According to the fifth aspect of the present invention which is based on the first aspect, the symbol classification unit further comprises a bit importance determining unit for determining the importance of each of bits in a symbol; an important bit number determining unit for determining the number of important bits in said symbol; a symbol importance judging unit for judging the importance of said symbol according to the numbers of important bits in said symbol and classifying said symbol.

According to the sixth aspect of the present invention which is based on the second aspect, the symbol interleaving unit rearranges the mapping result of said sub-carrier mapping unit by a lookup table according to said CSI and the classification result of said symbol classification unit.

According to the seventh aspect of the present invention which is based on the second aspect, the symbol interleaving unit performs, according to said CSI and the mapping result of said sub-carrier mapping unit, a rearrangement to minimize the absolute value of a difference between a symbol importance grade marking value and a respective channel fading intensity level corresponding to sub-carrier among the rearranged mapping results, wherein said symbol importance grade marking value represents the importance of a symbol, wherein when the symbol importance is higher, said marking value is smaller or higher, and when the channel state corresponding to the sub-carrier is poorer, said fading intensity level is higher or lower.

According to the eighth aspect of the present invention which is based on the second aspect, the symbol interleaving and channel mapping device further comprises a sub-carrier subset dividing unit for dividing the sub-carrier into a plurality of subsets; a symbol subset dividing unit for dividing said symbols into a plurality of subsets in the same number as that of said sub-carrier; a symbol interleaving unit for adjusting the mapping result of said sub-carrier mapping unit in respect to the subsets of said symbols.

According to the ninth aspect of the present invention, there is provided a symbol interleaving and channel mapping method, used in a transmitter of a mobile communication system, said transmitter receiving the channel state information (CSI) fed back from a receiver of the mobile communication system; said method comprises a symbol classification step for classifying symbols according to their importance; a sub-carrier mapping step for mapping said symbols on a sub-carrier; a symbol interleaving step for adjusting the mapping result of said sub-carrier mapping step according to the CSI and the classification result of said symbol classification step such that the important symbols correspond to the non deep fading sub-carrier as much as possible.

According to the tenth aspect of the present invention, there is provided a mobile communication system comprising a receiver and a transmitter, wherein said transmitter includes a symbol interleaving and channel mapping device according to any aspect of the aforementioned first to eighth aspects, and transmits de-arrangement information to said receiver; said receiver includes a symbol sub-carrier de-mapping unit, which processes the received symbol in an inverse manner to that of the symbol sub-carrier mapping unit according to said de-arrangement information, besides, said receiver feeds back the channel information to said transmitter.

In the mobile communication system according to the eleventh aspect of the present invention which is based on the tenth aspect, the de-arrangement information can be information representative of figures to be arranged by the transmitter.

According to another aspect of the present invention, there is provided a computer program, when executed by a computer or a logical element, enabling the computer or the logical element to perform the aforementioned method, or to be used as one or more of the aforementioned devices and component parts.

According to still another aspect of the present invention, there is provided a computer readable storage medium that stores the computer program, and can be a CD, a VCD, a DVD, a floppy disk, a magnetic disk, or a flash memory.

The symbol interleaving method based on the multiple carrier system according to the present invention rearranges the symbol order at the transmitter side so as to prevent the important bits in the unequal protection (UEP) forward error correction (FEC) codeword from being interfered by deep fading. The UEP code here can be any unequal protection FEC codeword, but the present invention is especially suitable for application in the long codes, such as the convolutional turbo codes (CTC) and the irregular low density parity-check codes (LDPC). The rearrangement process is based on the feedback channel state information (CSI).

During each transmission, the receiver of the multiple carrier system first transmits the previous CSI to the transmitter. The CSI can be transmitted in any form. In the present invention the fading degree level is the most direct method.

At the transmitter side, the modulated constellation symbols are classified into several grades according to how many important bits they contain. The grades' number is the same as the fading intensity levels' number. These constellation symbols are divided into several subsets. Each subset can be viewed as a certain arrangement figure of these symbols. The CSI for all the sub-carriers is divided into the same number of subsets. Before mapping symbols to sub-carriers, the symbol order is rearranged in each subset according to the corresponding CSI figure to prevent important bits from suffering deep fading as much as possible. This symbol rearrangement process is called symbol interleaving herein. The interleaving scheme is not the same for each subset, but once the CSI figure in one subset is fixed, the interleaving scheme is fixed. After the symbol interleaving process, the constellation symbols are transmitted.

At the receiver side, the previously transmitted channel state information (CSI) is stored until the current receiver processing is finished. Since the symbol interleaving process carries out the mapping with regard to the symbol order and the CSI order in the same subset in a one-by-one manner, the receiver de-interleaves the symbols in accordance with the previous channel state information (CSI).

More important bits are stored through this symbol interleaving method, and system performance is therefore enhanced.

DESCRIPTION OF THE ACCOMPANYING DRAWINGS

Specific embodiments of the present invention are described in greater detail below with reference to the accompanying drawings. The embodiments as shown in the drawings are only exemplary in nature, and should not be explained as restrictions to the present invention. In the drawings.

Figure 9:
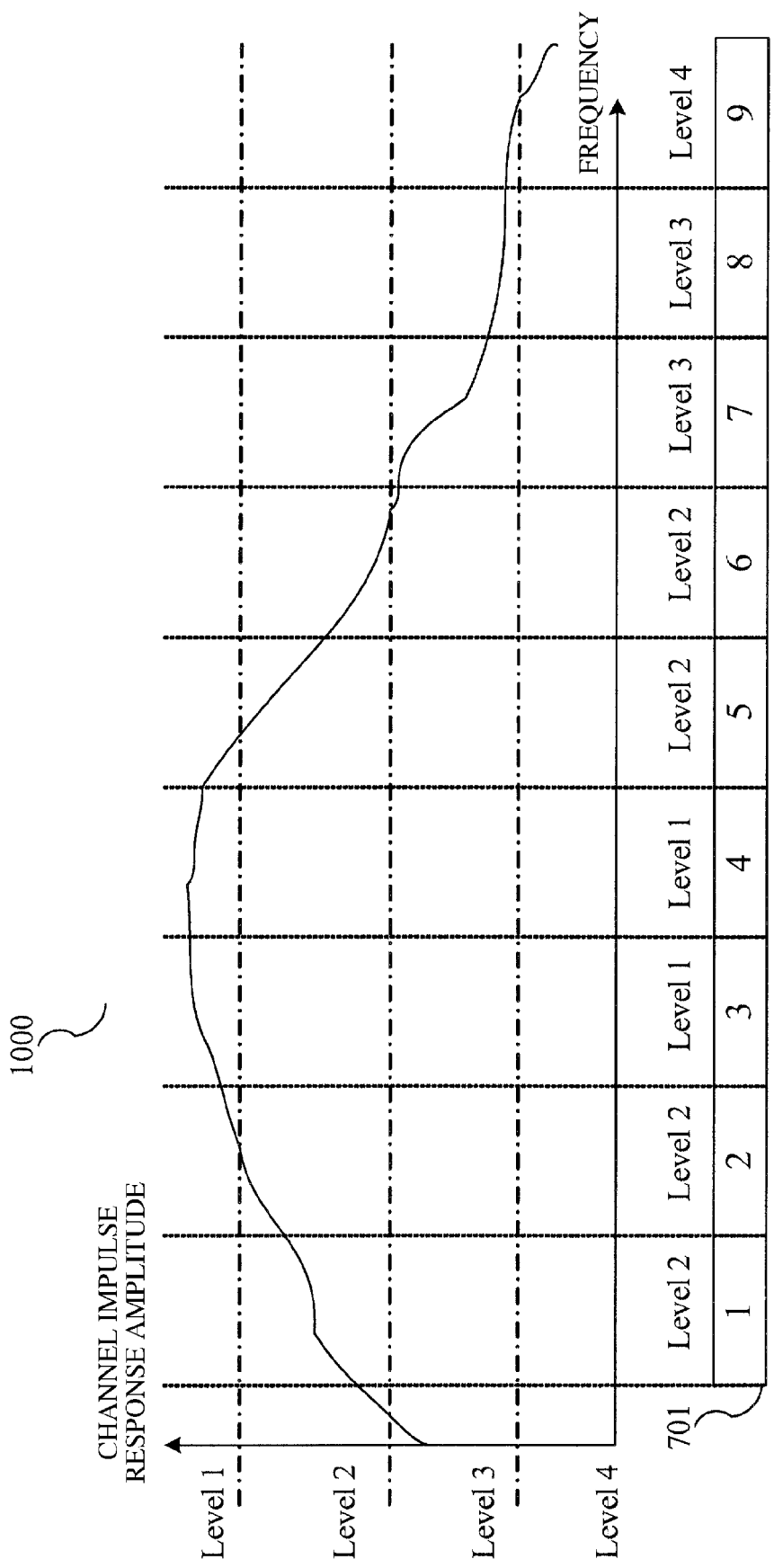
Figure 10:
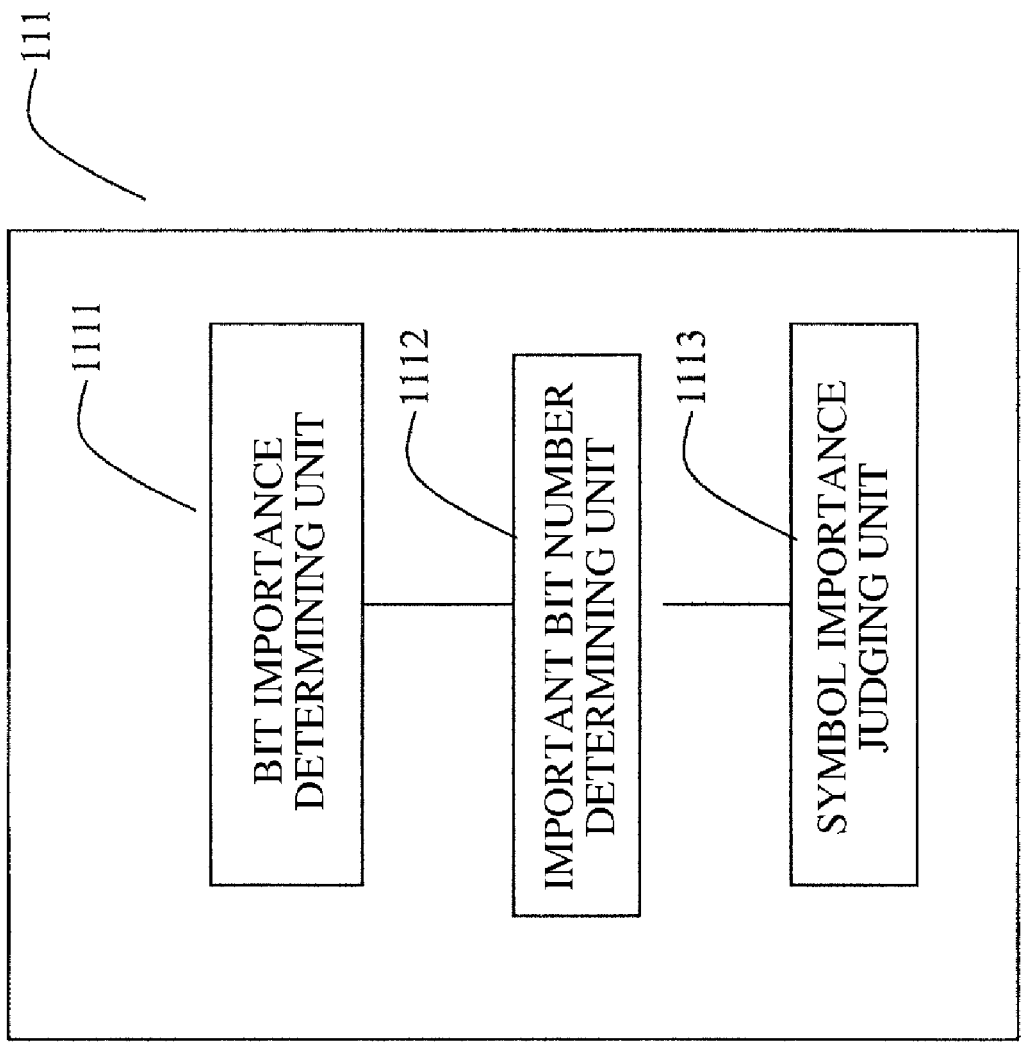
Figure 11:
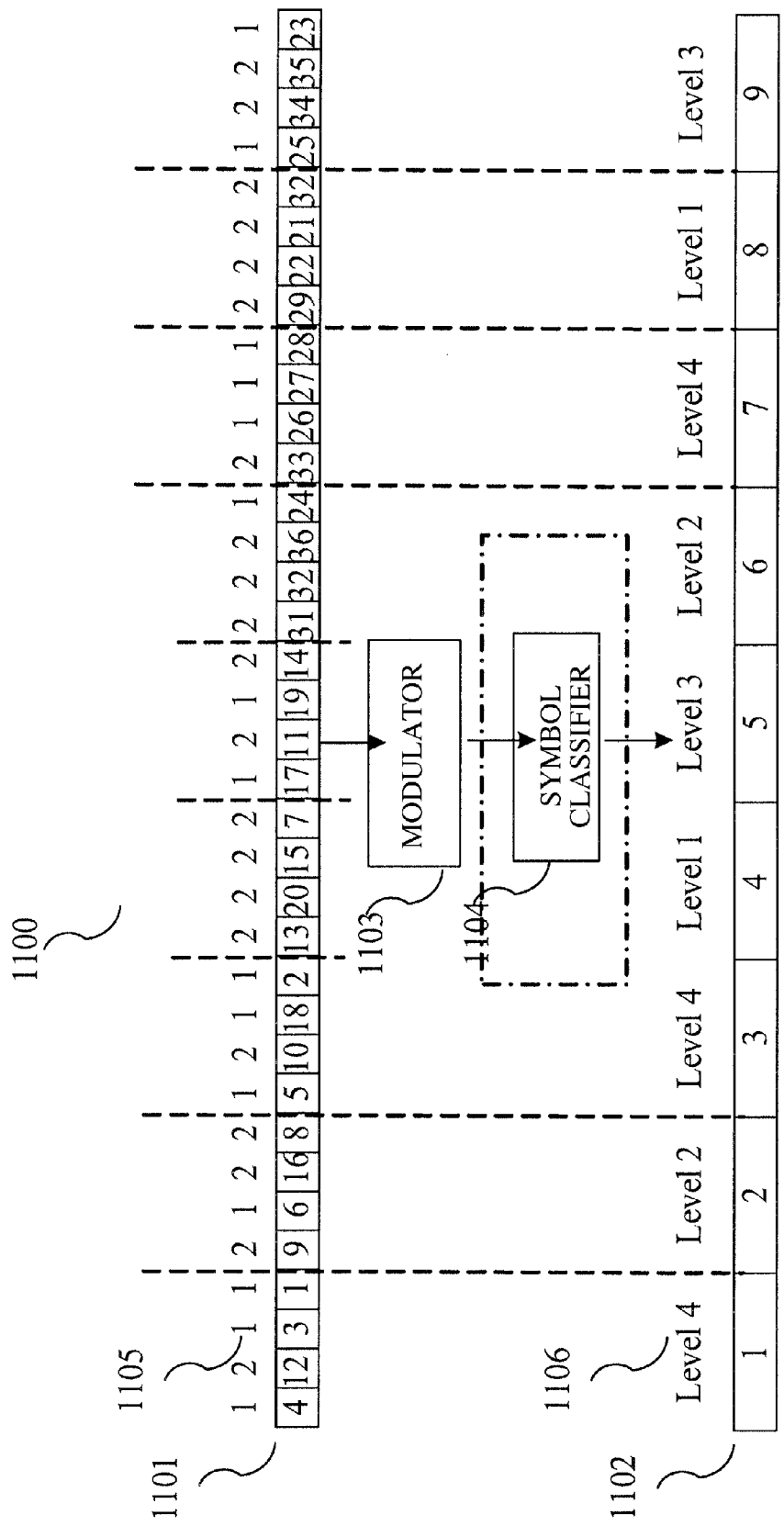
Figure 12:
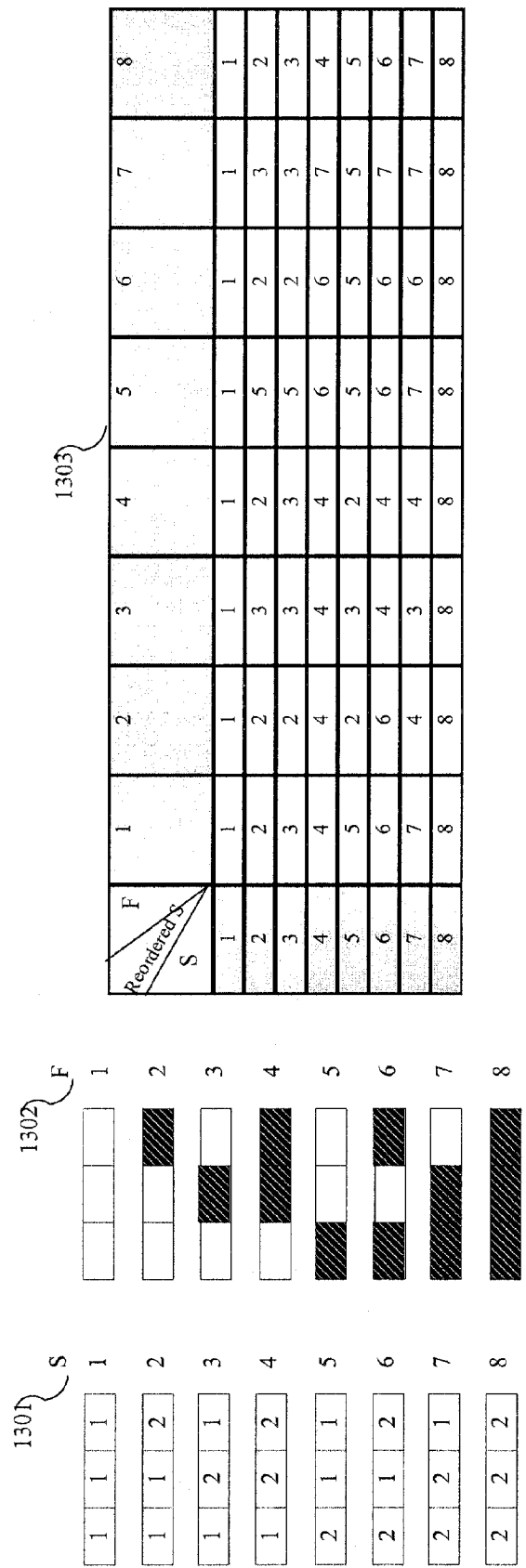
Figure 13:
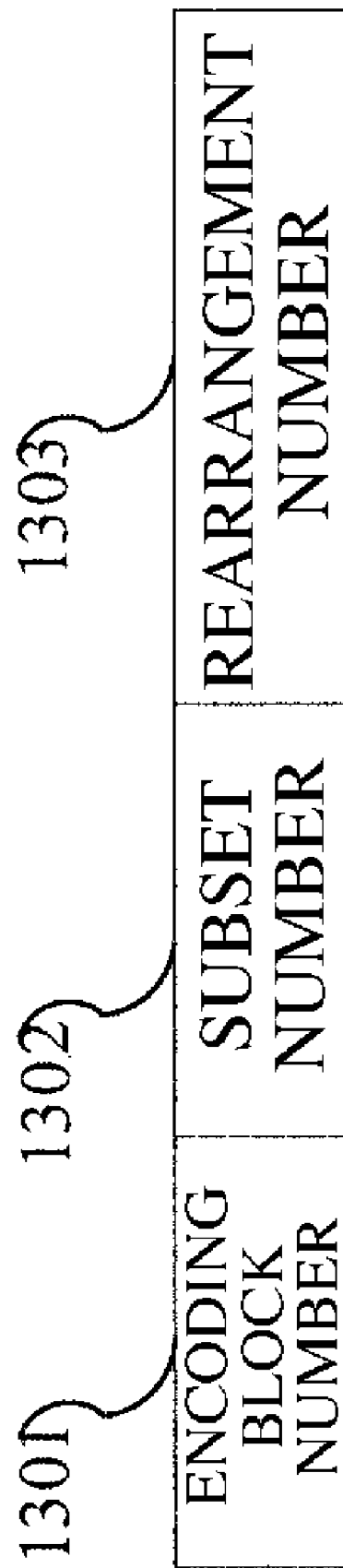
Figure 14:
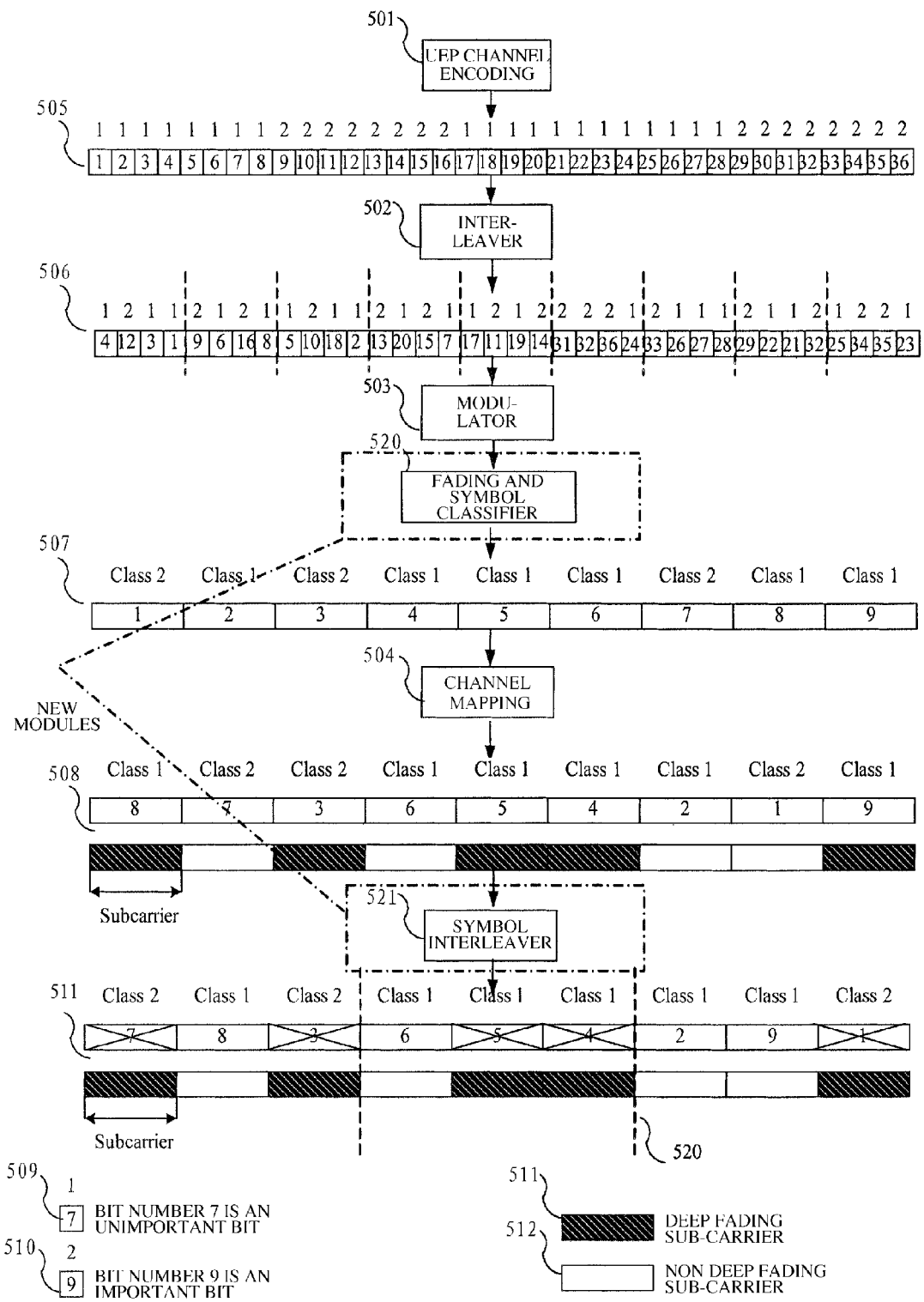
Figure 15:
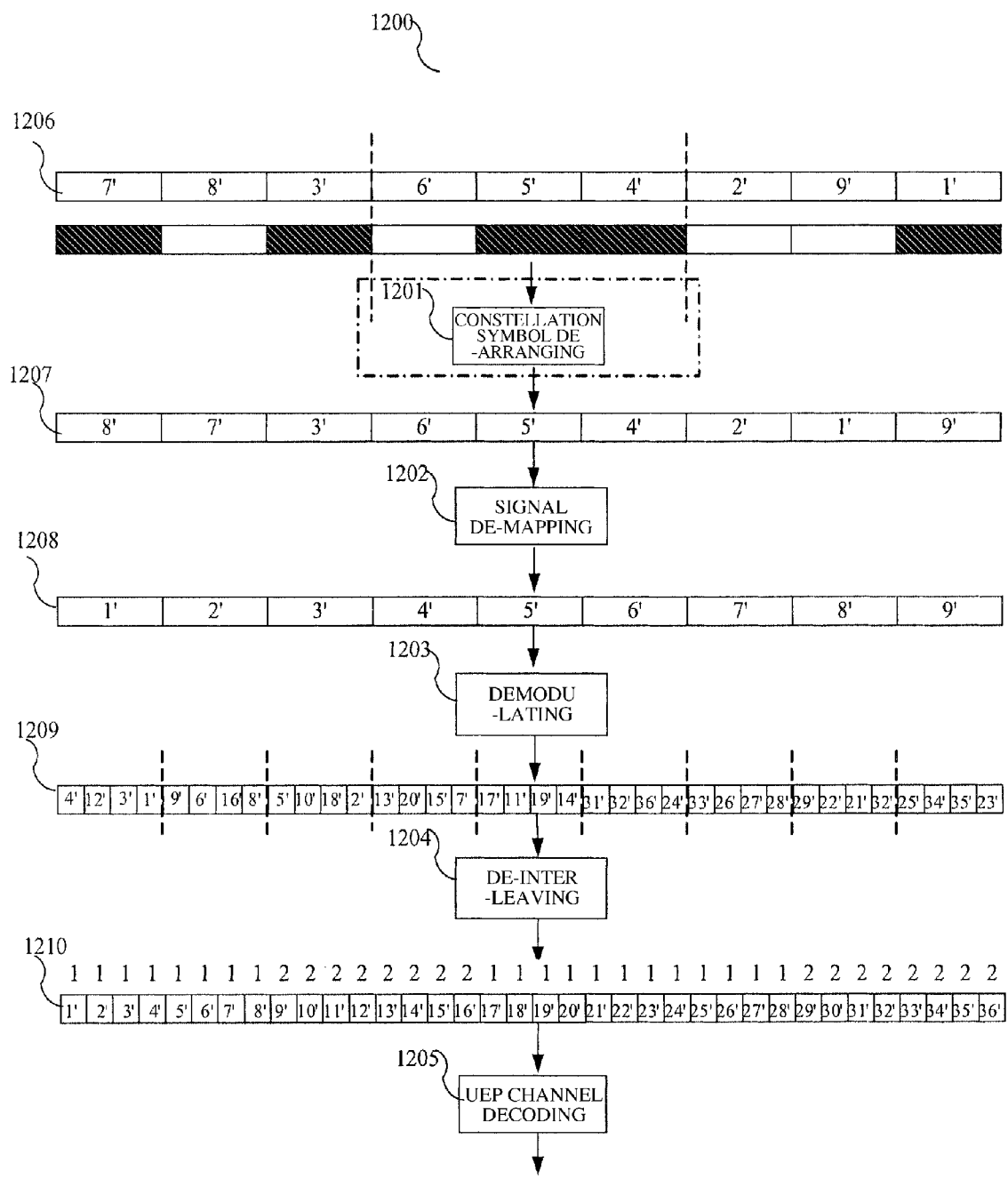

FIG. 9 schematically shows the process of sub-carrier classification;

FIG. 10 is a schematic block diagram showing the symbol classification unit according to one embodiment of the present invention;

FIG. 11 illustrates the process of symbol classification;

FIG. 12 provides an example of an embodiment for basic rearrangement of a lookup table;

FIG. 13 schematically shows a header for transmitting de-arrangement information;

FIG. 14 schematically shows a process for channel encoding at the transmitter side according to the present invention; and FIG. 15 schematically shows a signal processing procedure at the receiver side.

SPECIFIC EMBODIMENTS

Specific embodiments of the present invention are described in greater detail below with reference to the accompanying drawings. In all the figures contained herein, identical or similar reference numerals are used to indicate the same or similar component parts or steps.

Figure 6A:
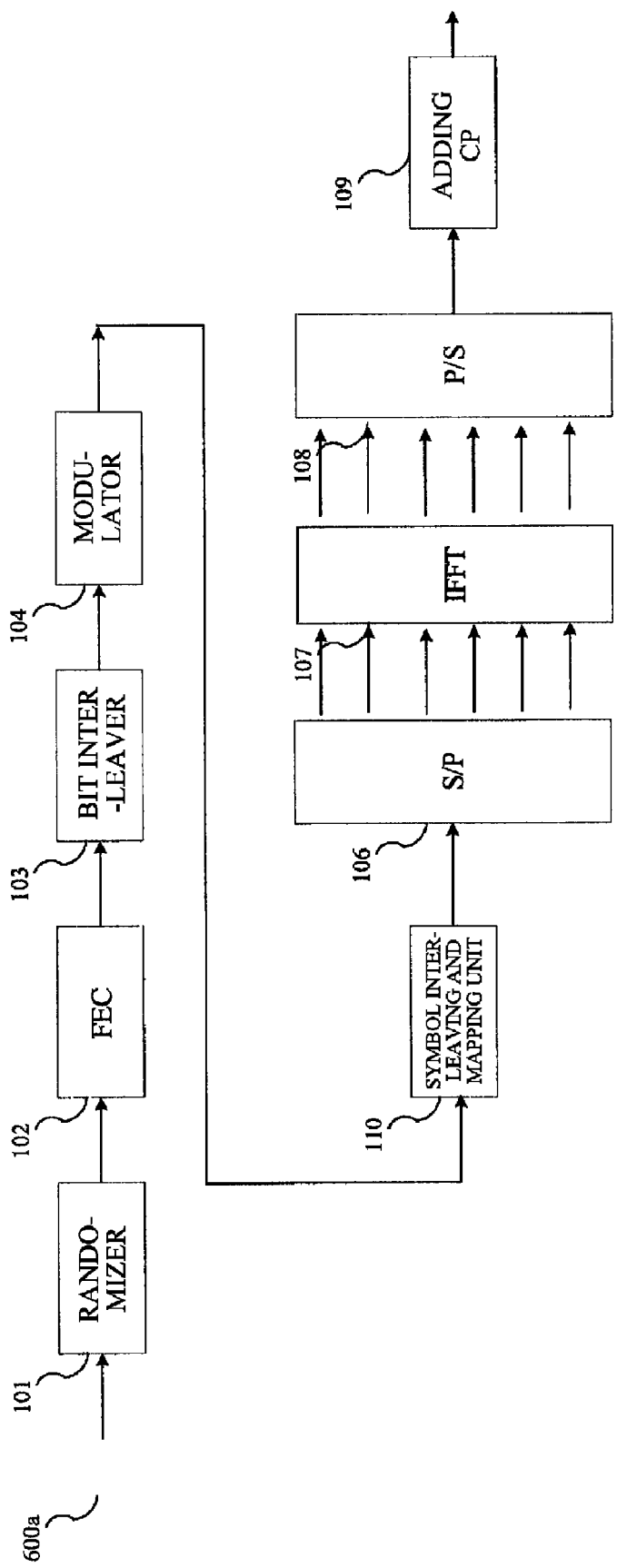
FIG. 6a is a block diagram showing a transmitter according to one embodiment of the present invention.
Figure 6B:
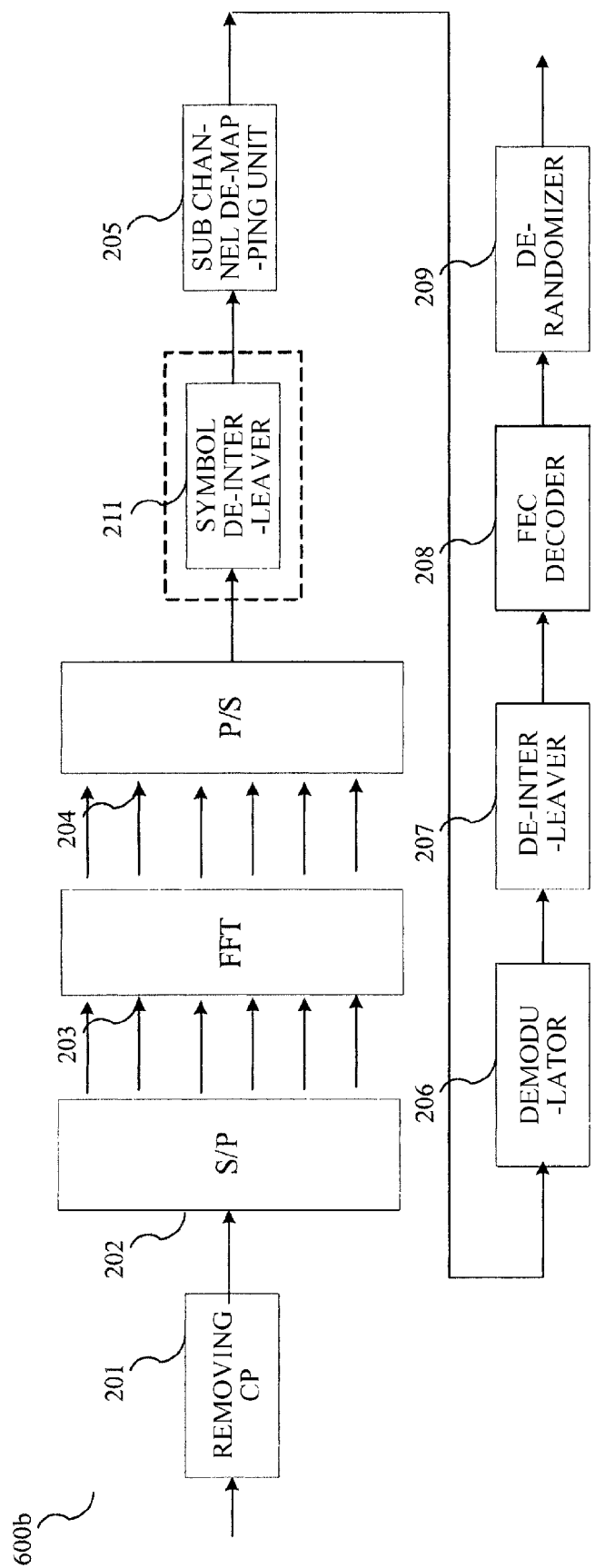
FIG. 6b is a block diagram showing a receiver according to one embodiment of the present invention.

FIG. 6a is a block diagram showing a transmitter according to one embodiment of the present invention. FIG. 6b is a block diagram showing a receiver according to one embodiment of the present invention. As shown in FIGS. 6a and 6b, the sub-carrier mapping unit 105 is replaced with the symbol interleaving and channel mapping unit 110 in the transmitter. Additionally, a symbol de-interleaving device 211 is added to the receiver.

FIG. 7 specifically shows the symbol interleaving and channel mapping unit 110 according to the embodiments of the present invention.

Figure 7A:
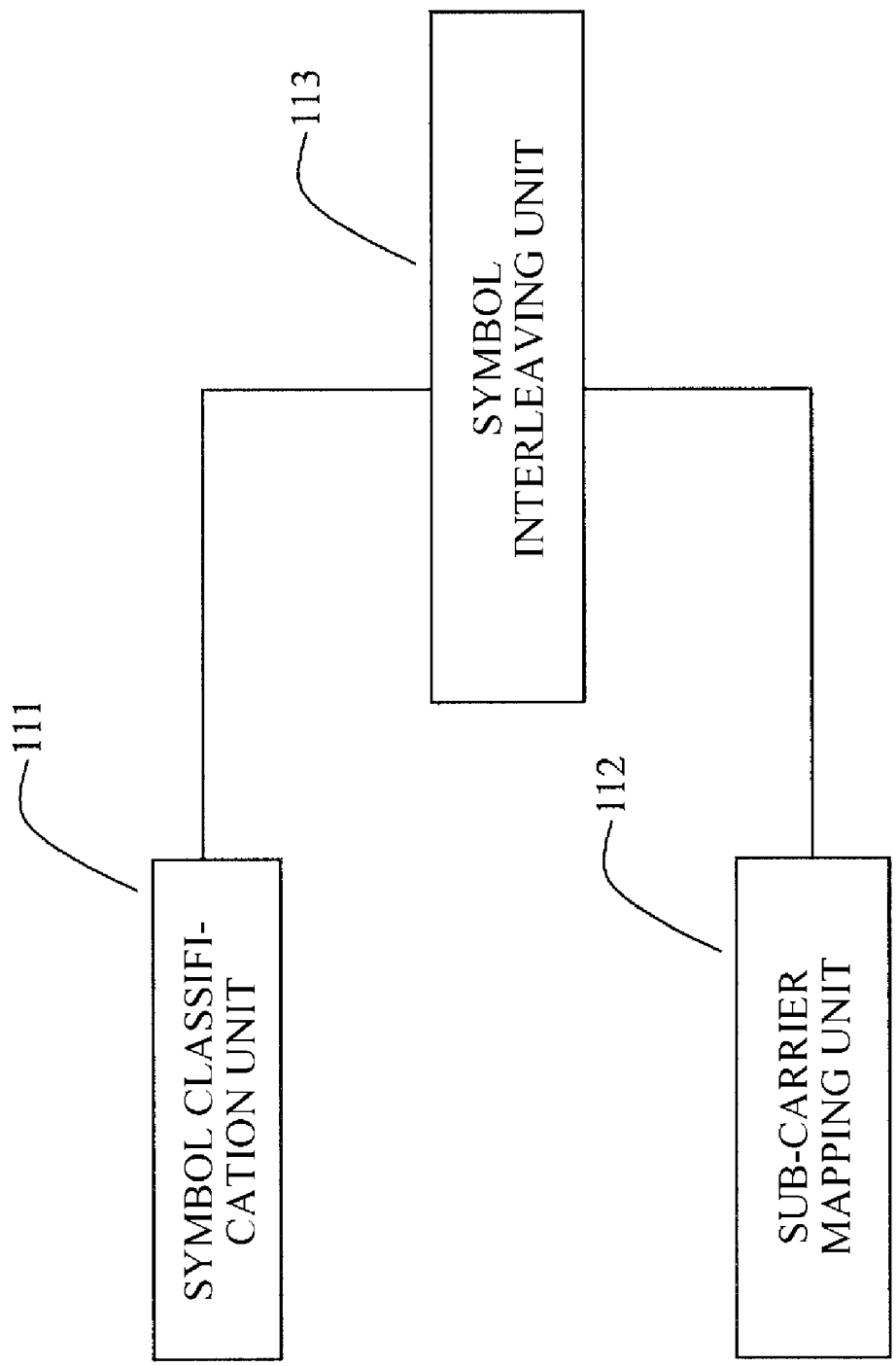
FIG. 7 shows a symbol interleaving and channel mapping unit according to one embodiment of the present invention.

FIG. 7a shows the symbol interleaving and channel mapping unit 110 according to one embodiment of the present invention. As shown in FIG. 7a, in this embodiment of the present invention, the symbol interleaving and channel mapping unit 110 comprises a symbol classification unit 111, a sub-carrier mapping unit 112 and a symbol interleaving unit 113. The sub-carrier mapping unit 112 has the same function as that of the conventional mapping unit 105, and is hence not described in this paper. The symbol classification unit 111 is used to classify the symbols. Classification of the symbols can be performed either before or after the sub-carrier mapping unit 112 mapping the symbols. The symbol interleaving unit 113 adjusts the mapping result of the sub-carrier mapping unit 112 in accordance with the classification result of the symbol classification unit 111 and the channel state information received by the transmitter and fed back from the receiver, so that important symbols after the adjustment correspond more to the non deep fading sub-carrier than before the adjustment.

Figure 7B:
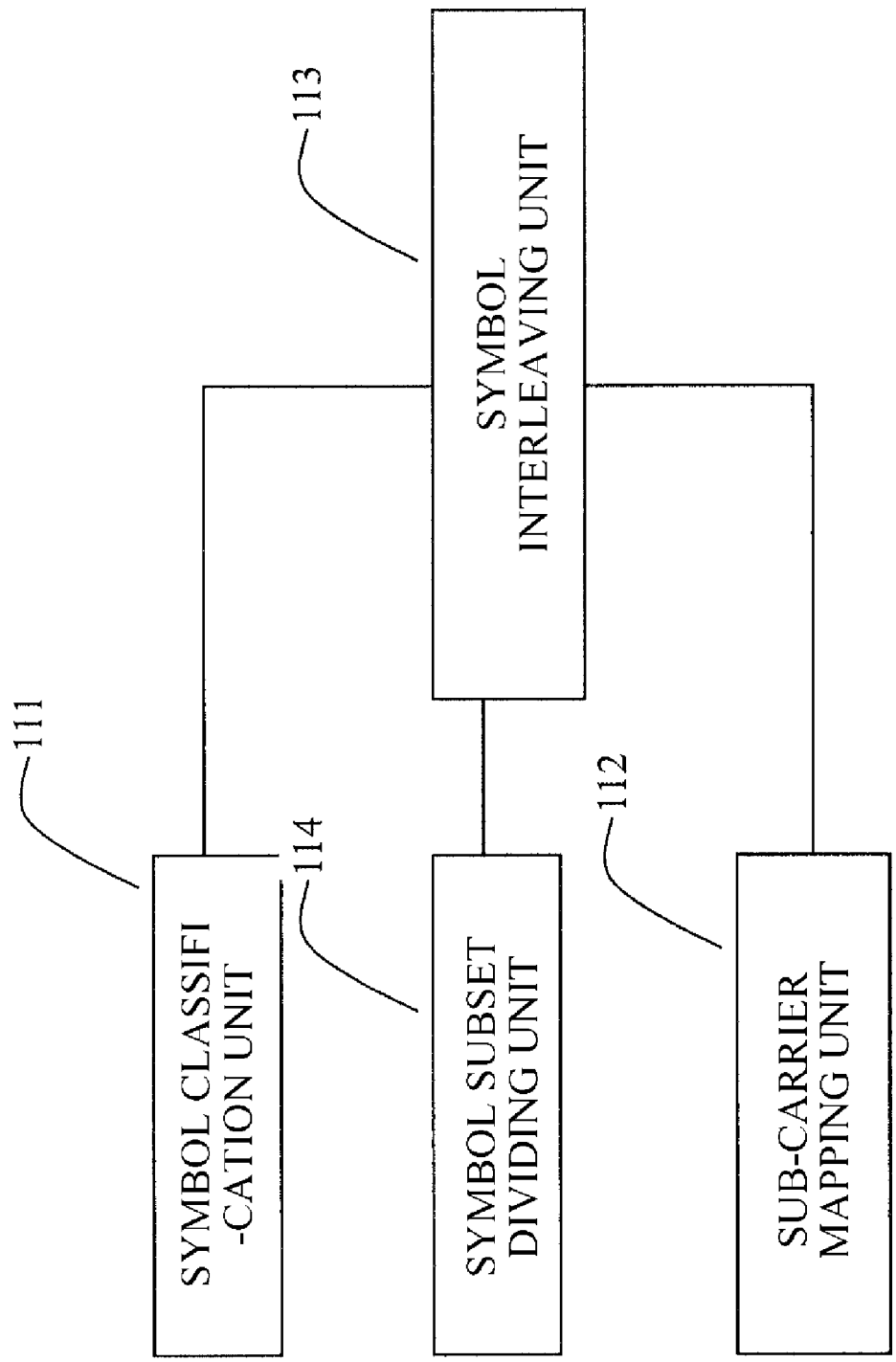

FIG. 7b shows the symbol interleaving and channel mapping unit 110 according to another embodiment of the present invention. In comparison with the symbol interleaving and channel mapping unit shown in FIG. 7a, the symbol interleaving and channel mapping unit in FIG. 7b is added with a symbol subset dividing unit 114. The symbol interleaving and channel mapping unit of this embodiment is applied to such a circumstance that the sub-carrier is divided into several subsets in the channel state received by the receiver. In this case, the symbols are also correspondingly divided into several subsets. The number of the subsets for the divided symbols is the same as the number of the subsets divided from the sub-carrier. In this case, the adjustment to the mapping result of the sub-carrier mapping unit 112 by the symbol interleaving unit 113 is performed with regard to each subset of symbol. The subset division to the symbols and the channels can reduce the computational load of the transmitter and the receiver, and enhance the response speed.

Figure 7C:
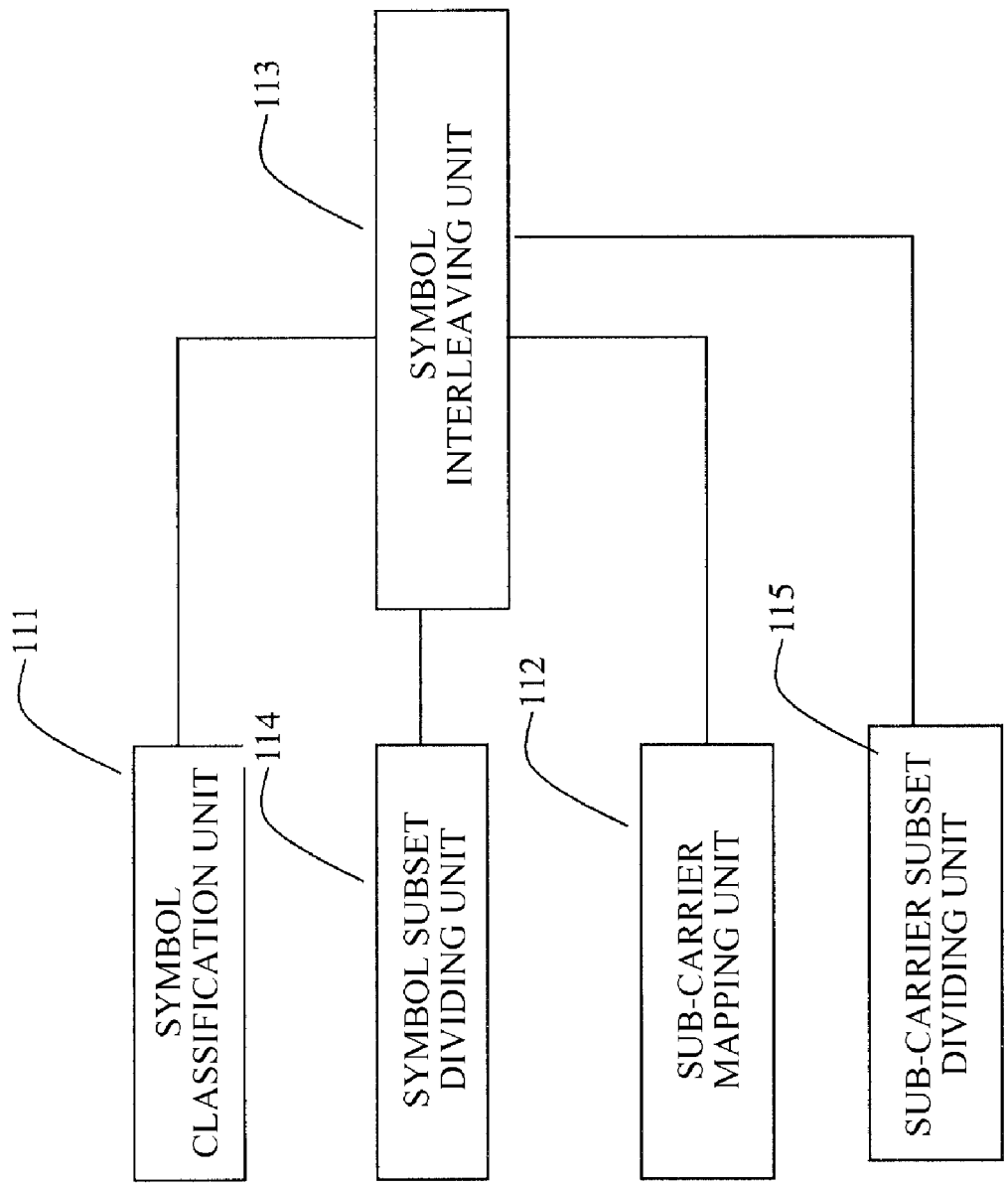

FIG. 7c shows the symbol interleaving and channel mapping unit 110 according to still another embodiment of the present invention. In comparison with the symbol interleaving and channel mapping unit shown in FIG. 7b, the symbol interleaving and channel mapping unit in FIG. 7c is added with a sub-carrier subset dividing unit 115. It is possible, when the sub-carrier is not divided in the channel state information fed back from the receiver, to divide the sub-carrier at the transmitter, to thereby reduce the computational load of the transmitter and the receiver, and enhance the response speed.

Figure 7D:
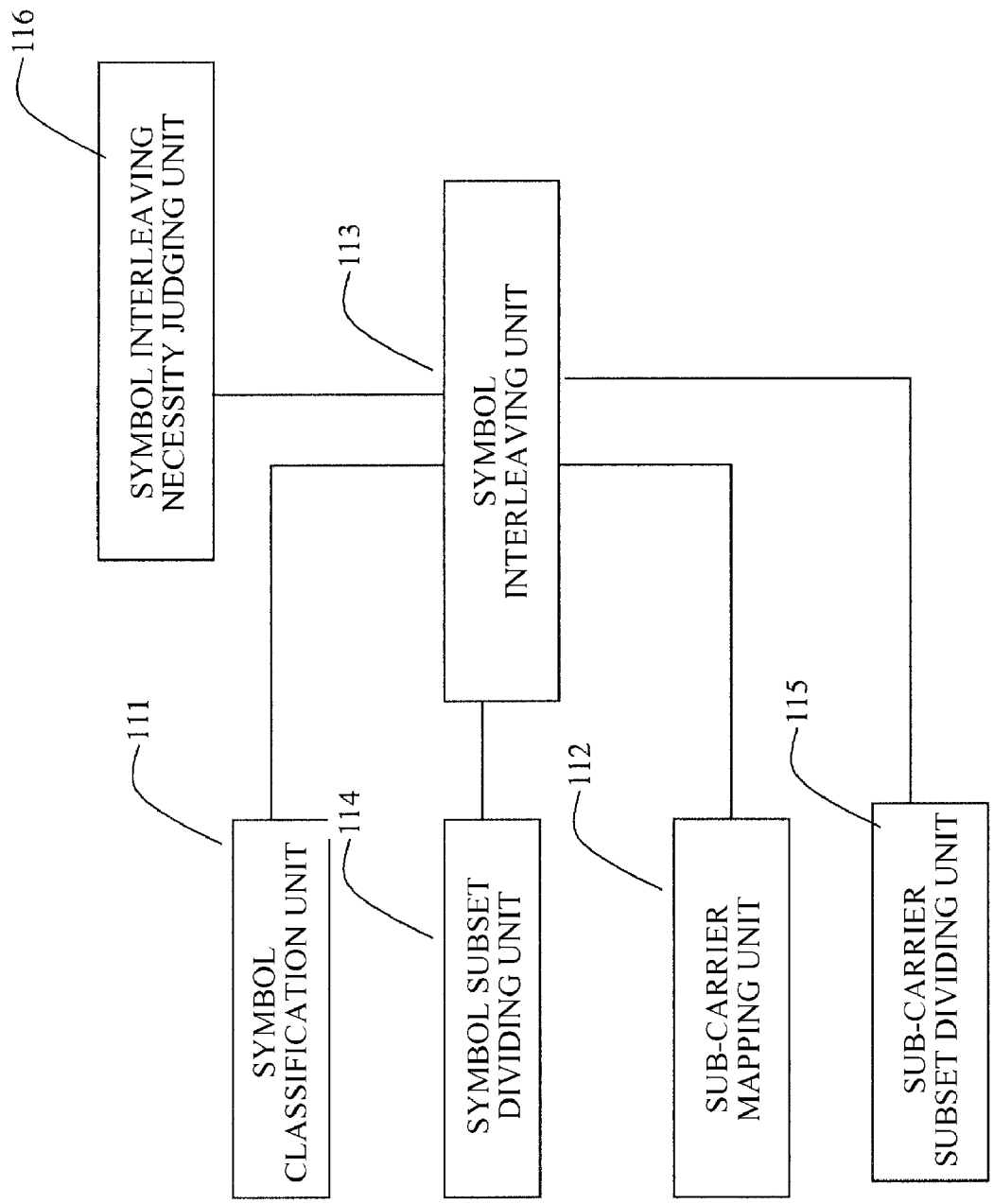

FIG. 7d shows the symbol interleaving and channel mapping unit 110 according to yet another embodiment of the present invention. In comparison with the symbol interleaving and channel mapping unit shown in FIG. 7c, the symbol interleaving and channel mapping unit in FIG. 7d is added with a symbol interleaving necessity judging unit 116 for judging whether it is necessary to adjust the mapping result of the sub-carrier mapping unit 112 to thereby avoid unnecessary adjustment and enhance the response speed.

The present invention is described below with reference to FIG. 7d. Obviously, a person skilled in the art will clearly know of the implementation and the operational flows of FIGS. 7a to 7c as long as she or he knows of the implementation and operational flow of the embodiment shown in FIG. 7d. Accordingly, description to other embodiments is omitted herein.

Figure 8:
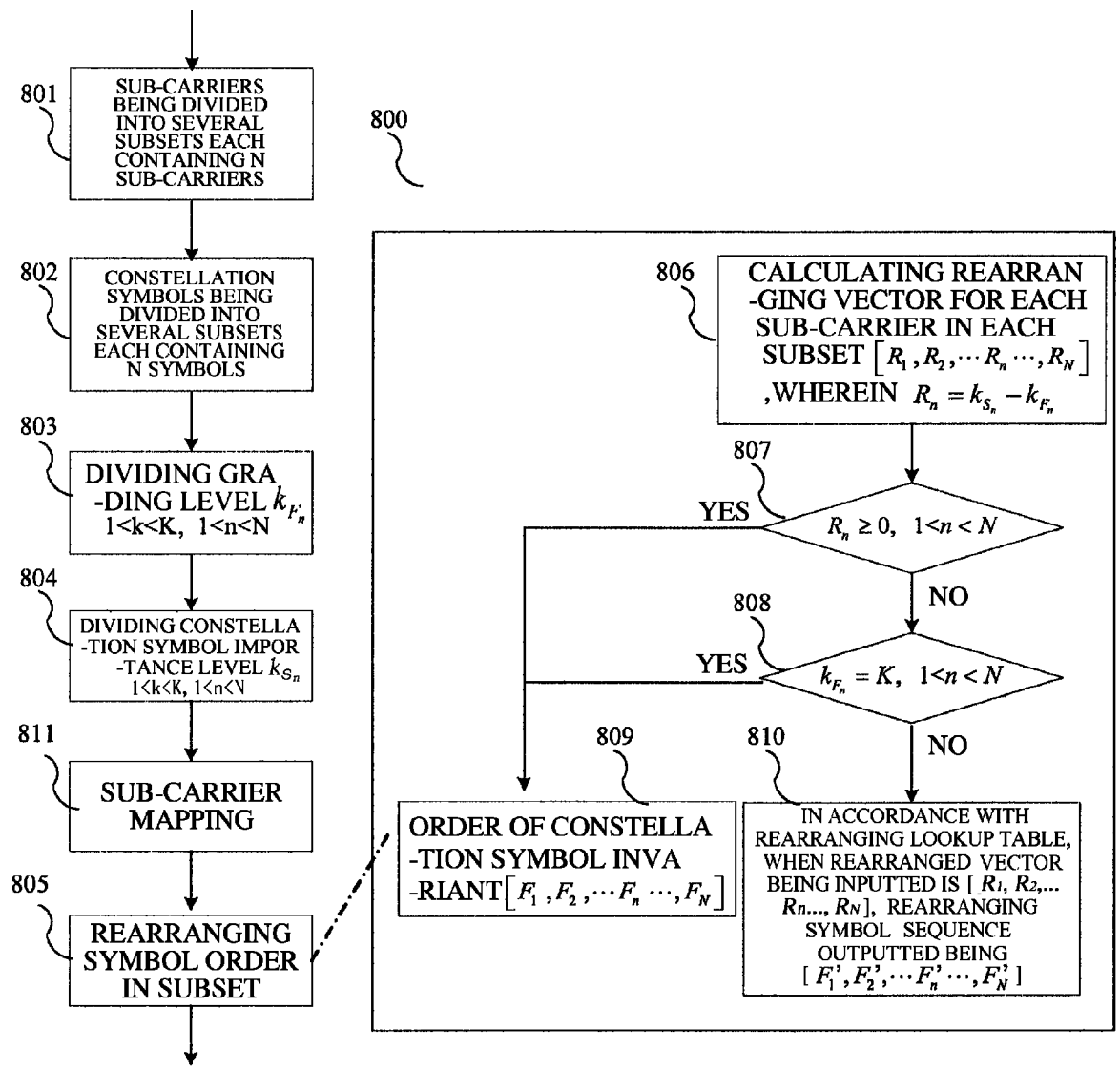
FIG. 8 is a flowchart showing the symbol interleaving at the transmitter side according to one embodiment of the present invention.

FIG. 8 is a flowchart showing symbol interleaving at the transmitter side according to one embodiment of the present invention. Firstly in Step 801, the sub-carrier is divided into several subsets by means of the sub-carrier subset dividing unit 115, and each of the subsets contains N sub-carriers, where N is a small positive integer capable of being exactly divided by the total number of the sub-carriers. This step is also referred as sub-carrier subset dividing step, in which the sub-carriers are divided in accordance with the corresponding fading intensities of different sub-carriers. That is to say, in one embodiment of the present invention, the multiple carrier system is firstly divided into a plurality of sub-carriers having the same bandwidth, and subsequently all of the sub-carriers are divided into subsets with the same number. As previously mentioned, the reason for performing subset division is that the rearrangement of the sub-carriers in each subset is much less complex than the rearrangement of all the sub-carriers at one time. In the present invention, the connotation for rearranging the sub-carriers is consistent with the connotation for rearranging the symbols. The number of subsets that could be divided (in other words, the value of the number N) can be determined on the basis of the processing capability of the system and various requirements on the system (such as QoS requirement), etc. Generally speaking, the greater the value of N is, the better will be the rearrangement of the symbols by the present invention, but correspondingly, the higher demand will be put on the processing capability.

Subsequently in Step 802, the constellation symbols are divided into subsets with the same number. That is to say, the number of subsets of the constellation symbols is the same as the number of subsets of the sub-carriers. Each subset contains N symbols. Then in Step 803, the fading grade of each sub-carrier in the feedback channel state information (CSI) is determined. The fading grade of each sub-carrier $F_n$, where n=1, 2, . . . N, is marked by $l_{F_n}$, and the bigger $l_{F_n}$ is, the higher will be the fading grade, where 0<l<=L, and L is a predetermined positive integer greater than 1. The fading grade is obtained from the feedback channel state information. The symbol interleaving unit 113 and the symbol interleaving necessity judging unit 116 can directly obtain the fading grade from the feedback channel information.

FIG. 9 shows the process of sub-carrier classification. Frequency consecutive channel impulse response is classified into several levels according to its amplitude. The number of levels is decided by the processing capability of the device, and can be predetermined. The greater the level is, the higher will be the complexity. In addition, usually classification is based on the exponential magnitudes of 2, i.e., 2, 4, 8, 16, etc., so as to facilitate digital processing. In other words, the amplitude of the channel impulse response is divided into several segments (4 segments as schematically shown in this Figure, namely 4 levels) in accordance with a predetermined criterion, and the corresponding fading grade is determined in accordance with the segment into which the channel impulse response of each sub-carrier (1-9) falls. After subset division, the fading grade sequence corresponding to each sub-carrier is $k_F=[k_{F_1}, k_{F_2}, \ldots k_{F_n}, \ldots, k_{F_N}]$. As schematically shown in FIG. 9, the fading grades of each of the sub-carriers of a subset 901 that contains 9 sub-carriers are respectively [2,2,1,1,2,2,3,3,4]. As should be noted, the receiver performs the process of the sub-carrier classification in general.

Referring back to FIG. 8, in Step 804, the symbol classification unit classifies each constellation symbol $S_n$, where n=1, 2, . . . N, in each subset. The classification is performed in accordance with the importance level of each constellation symbol. The importance level of each constellation symbol $S_n$ is marked as $k_{S_n}$, where k=1, 2, . . . K. K is the predetermined highest level, and is a positive integer. The smaller k is, the higher will be the importance. Of course, it might as well be that the greater k is, the higher the importance, as this depends upon antecedent agreement and affects no understanding to the present invention. Accordingly, explanation is made in the following paragraphs in the case that the smaller k is, the higher will be the importance. Please note that L and K can either be identical or not identical. However, simplified processing is possible if L and K are identical. Since the principle for processing when L and K are not identical is the same as the principle for processing when L and K are identical, it is entirely possible for those skilled in the art to understand the processing when L and K are not identical once they understand the processing when L and K are identical. Accordingly, in order to facilitate explanation, the following description is made taking as an example of L and K being identical. That is, the fading grade of each sub-carrier $F_n$, where n=1, 2,. . . N, is marked by $k_{F_n}$.

Figure 1:
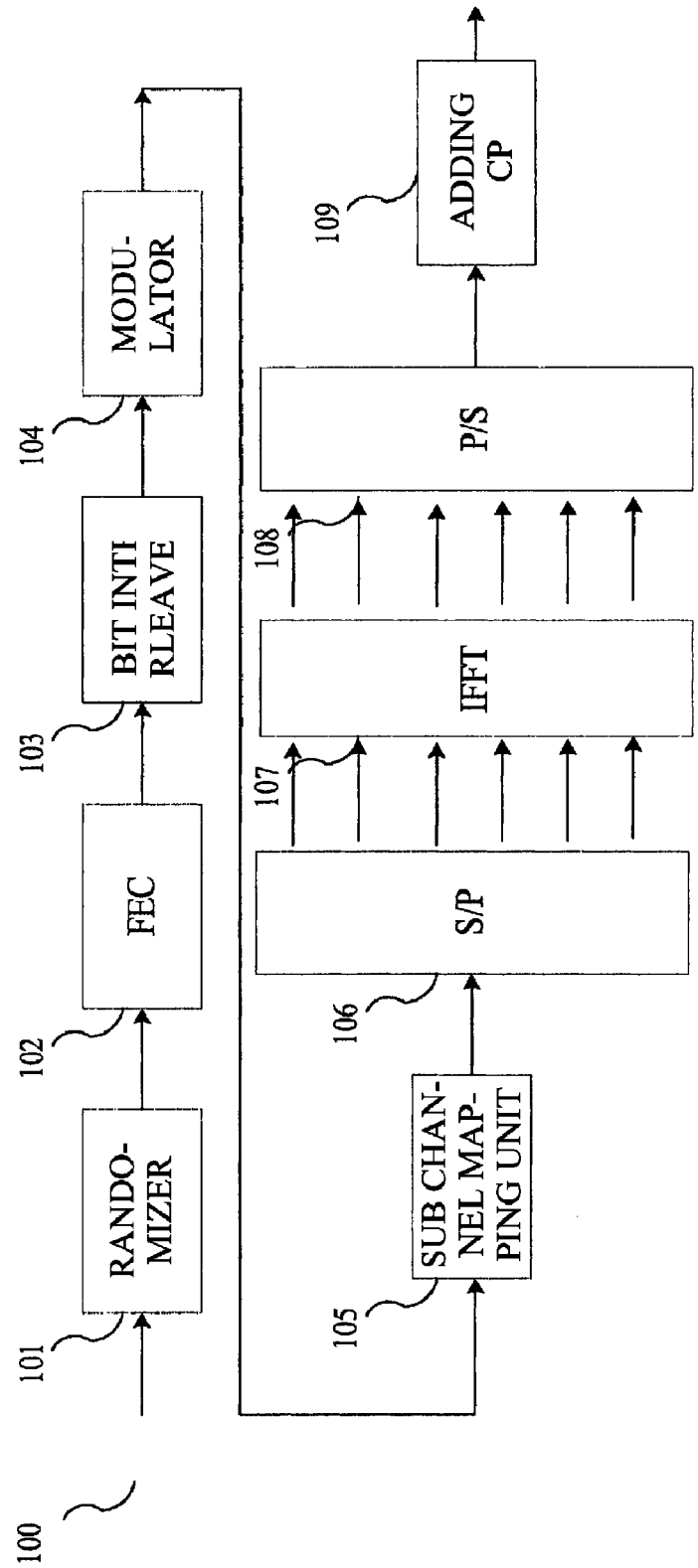
FIG. 1 is a schematic block diagram showing a prior-art transmitter 100.
Figure 2:
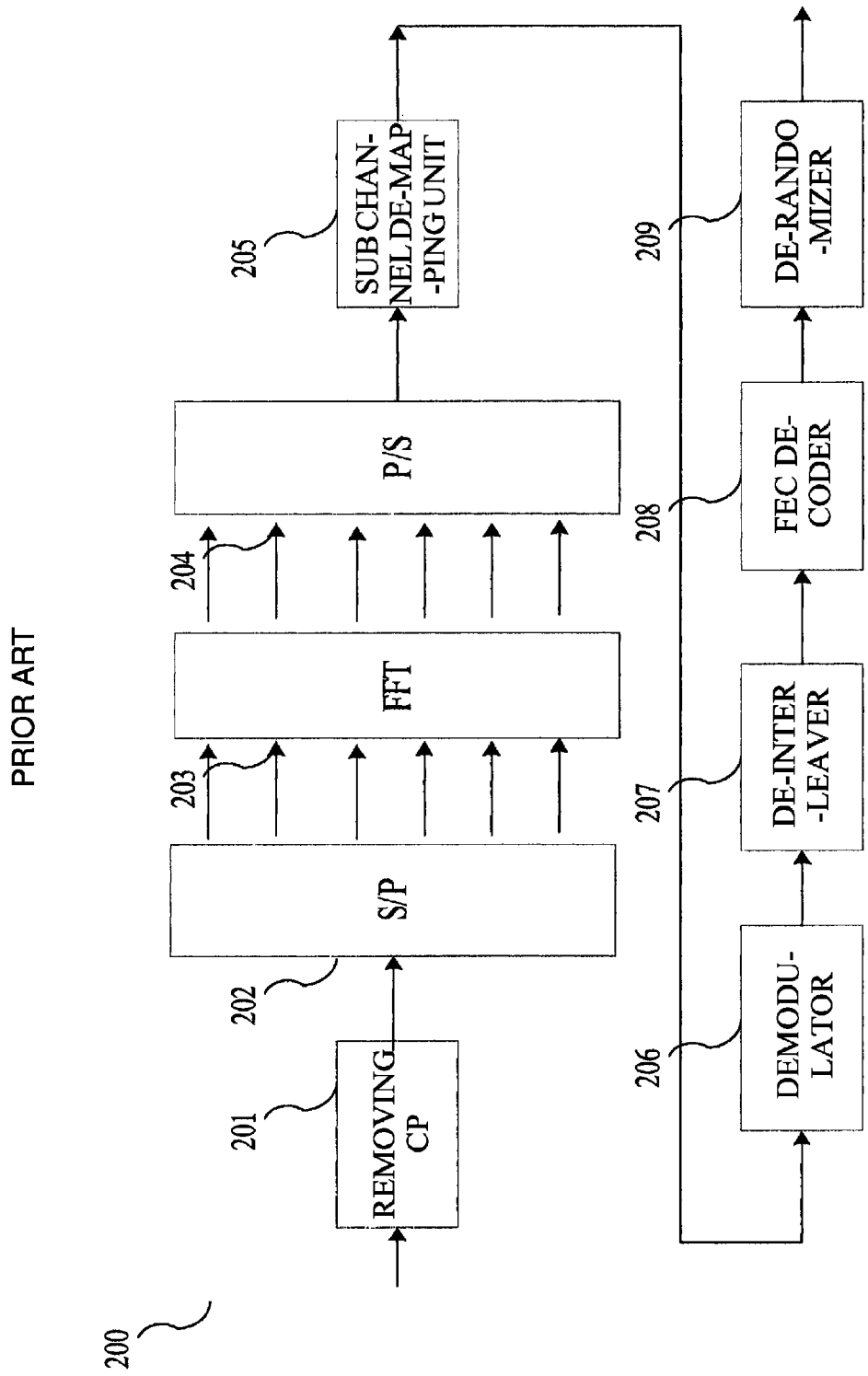
FIG. 2 is a schematic block diagram showing a prior-art receiver 200.
Figure 3:
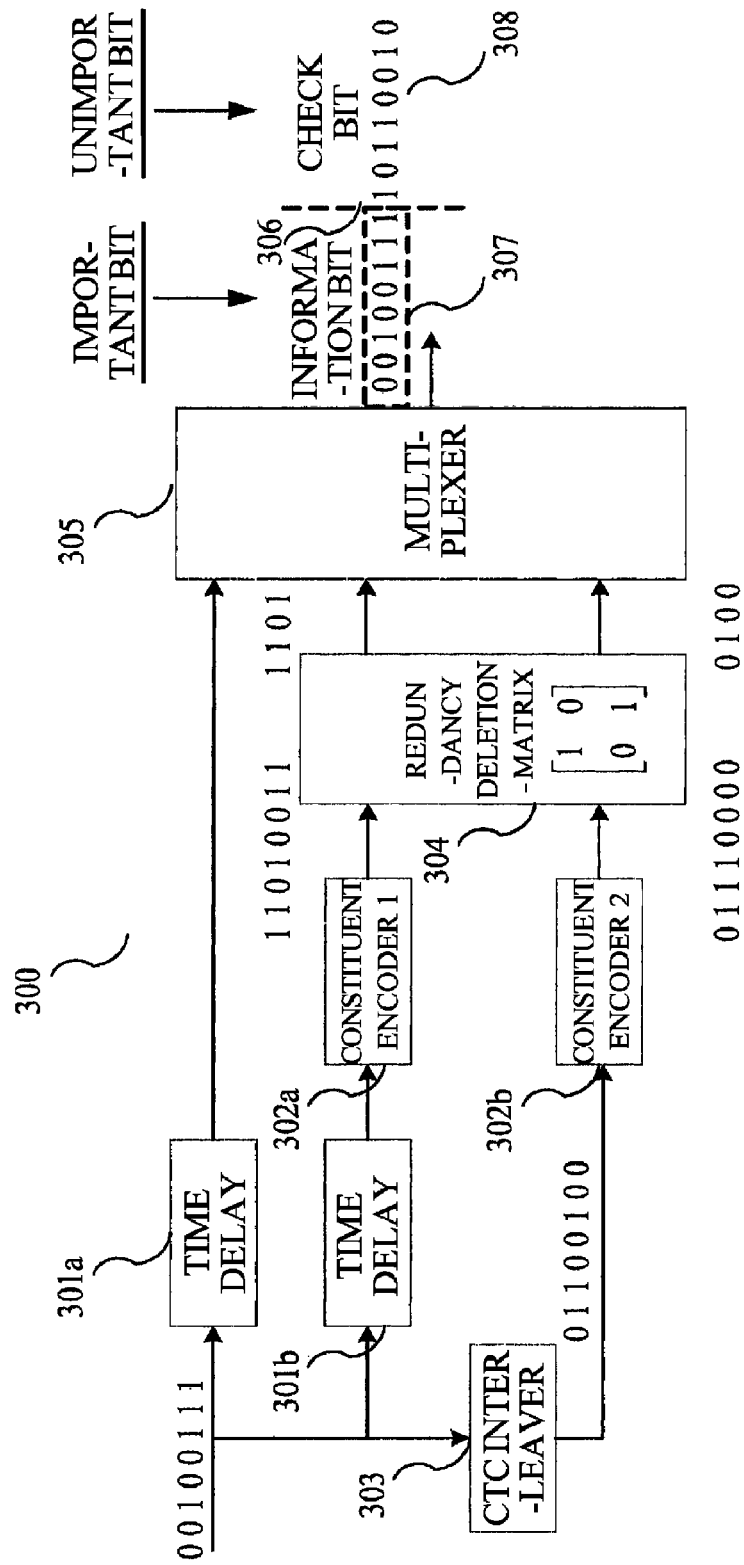
FIG. 3 is a schematic view of an encoder 102 with a ½ code rate convolutional turbo code.
Figure 4:
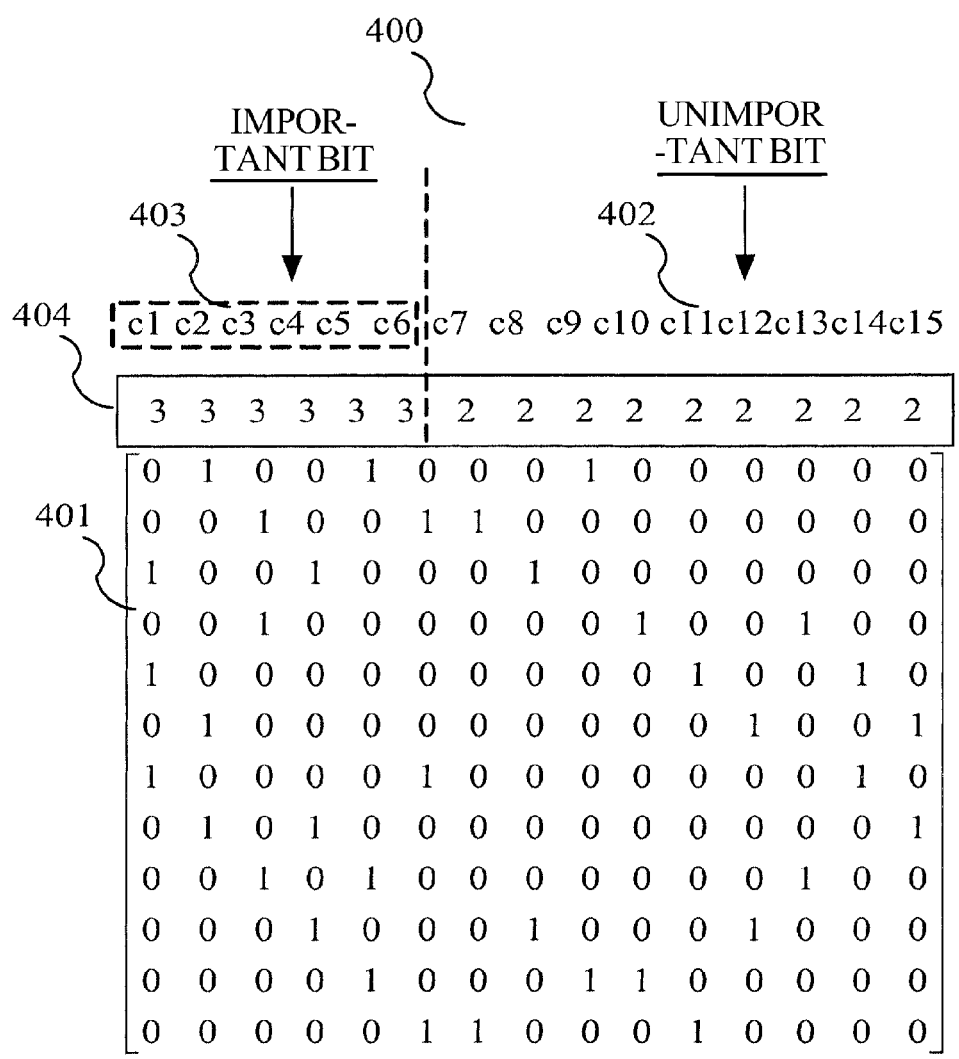
FIG. 4 is a schematic view of a check matrix of an irregular low density parity-check (LDPC) code.

FIG. 10 is a block diagram showing the symbol classification unit 111 according to one embodiment of the present invention. As shown in FIG. 10, the symbol classification unit 111 comprises a bit importance determining unit 1111, an important bit number determining unit 1112, and a symbol importance judging unit 1113. The bit importance determining unit 1111 determines the importance of each bit in the symbol. As previously mentioned, the importance of each bit in the symbol varies with the varying encoding methods; refer to FIGS. 3 and 4 for this. The bit importance determining unit 1111 can determine the importance of each bit in the symbol in accordance with the encoding method employed in the transmitter. The important bit number determining unit 1112 determines the number of important bit in each symbol. The symbol importance judging unit determines the importance of a symbol in accordance with the number of important bit in this symbol, and performs classification on the basis thereof. The judgment can be carried out according to a certain criterion, for instance, by judging as important symbols the symbols whose number of important bit is greater than a threshold.

FIG. 11 illustrates the process of symbol classification. An sequence 1101 having been bit-interleaved is modulated into a symbol sequence 1102. A bit importance marker 1105 marks up all important bits (indicated by 2 in FIG. 11). Dependent upon the numbers of important bits contained, the constellation symbols are divided into several importance levels, for instance as indicated by a symbol importance marker 1106; the importance levels in FIG. 11 are altogether 4 levels. The first level contains 4 important bits, the second level contains three important bits, the third level contains 2 important bits, and the fourth level contains less than 2 important bits. Of course, the number of the divided levels can also be varied: as schematically shown in FIG. 14, there are only two levels divided. After subset division, a symbol importance level sequence $k_S=[k_{S_1}, k_{S_2}, \ldots, k_{S_n}, \ldots, k_{S_N}]$ is obtained.

Now referring back to FIG. 8, the sub-carrier mapping unit 112 performs sub-carrier mapping in Step 811. This mapping step is the same as the prior-art step 504, and is therefore not explained in detail here. As should be noted by those skilled in the art, the foregoing steps 801 to 804 are not stationary but variable, and can be executed either in sequence or in parallel. Moreover, these steps can be performed either before Step 811 or after Step 811. In addition, although the judgment of bit importance in FIG. 14 is carried out before modulation, this step can also be carried out after modulation. In general, the descriptions to FIG. 14 and FIG. 8 are only exemplary in nature rather than restrictive to the present invention.

Subsequently in Step 805, the symbol interleaving unit rearranges the symbols in respect to each subset of the sub-carrier. Steps 806-810 to the right in FIG. 8 illustrate Step 805 in detailed.

Specifically, in Step 806, the following Equation (1) is calculated in respect to each symbol in each subset of the sub-carrier:

$$R_n = k_{S_n} - k_{F_n}, 1 < k_{S_n} \leq K, 1 < k_{F_n} \leq K, 1 < n \leq N \quad (1)$$

where $R_n$ is the intensity difference, the value of which can be any integer ranging from $-(K-1)$ to $K-1$.

It is possible to judge whether $R_n$ is greater than a predetermined threshold, which can indicate that an unimportant symbol encounters a sub-carrier with deep fading, or that an important symbol encounters a sub-carrier with non deep fading. In the case of that stated above, in which the smaller the $k_{sn}$ is, the more important will be the symbol (for instance, 1 indicates the important symbols, and 2 indicates the unimportant symbols), and the bigger $k_{fn}$ is, the deeper fades the carrier (1 indicates non deep fading, and 2 indicates deep fading), the value of the threshold is set as 0, then $R_n > 0$ means that a less important symbol corresponds to a non deep fading sub-carrier. $R_n < 0$ means that an important symbol encounters a deeper fading sub-carrier, which is tried to be avoided in the present invention. The following intensity difference vector is hereby obtained in respect to each subset, and it will be decided as how to perform the rearrangement in accordance with this vector:

$$R = [R_1, R_2, \ldots R_n \ldots, R_N], 1 < n < N \quad (2)$$

Subsequently in Steps 807 and 808, the symbol interleaving necessity judging unit judges whether it is necessary to perform symbol interleaving. Specifically, it is judged in Step 807 whether $R_n \geq 0$ is in respect to all sub-carriers in a subset, and if yes (Step 807, YES), this means that deep fading is avoided for all important bits, so that Step 809 is started. It is unnecessary to perform rearrangement for this case. As shown in Step 809, the symbols are not rearranged, and the symbol order is like before.

On the other hand, if not all Rs are greater than 0 (Step 807, NO), it is judged in Step 808 as to whether $k_{F_n} = K$ is in respect to all sub-carriers Fs in a subset. If yes, (Step 808, YES), this means that the channel state is at the worst, so that there will be no help even with rearrangement, and Step 809 is therefore also started without any variation.

Rearrangement of the symbols is required except for the two special circumstances mentioned above. That is to say, when it is judged as NO in Step 808, the processing enters Step 810 to perform rearrangement.

The scheme of rearrangement for the transmitter and the receiver has been determined before each transmission of data.

The order of rearrangement in each subset can be decided by the following Equation:

$$S' = f(S, R) \quad (3)$$

where $R=[R_1, R_2, \ldots R_n \ldots, R_N]$, $S=[S_1, S_2, \ldots S_n \ldots, S_N]$ and $S'=[S_1', S_2', \ldots S_n' \ldots, S_N']$ so that $$E\{|R'|\} = \frac{1}{N}\sum_{n=1}^{N}|R'| = \frac{1}{N}\sum_{n=1}^{N}|k_{S_n'} - k_{F_n'}| \quad (4)$$

has the least value, where, $1 < k_{S_n'} < K, 1 < k_{F_n'} < K, 1 < n < N$ $F' = [F_1', F_2', \ldots F_n' \ldots, F_N']$ is the fading order after rearrangement, at which time $F_1'$ corresponds to the position of a certain sub-carrier in the original arrangement, rather than a sub-carrier reference numbered as 1. $k_{F_n'}$ is the fading intensity mark of the sub-carrier after rearrangement. $k_{S_n'}$ is the symbol importance mark of the original arrangement. R' is the intensity difference after rearrangement. $E\{|R'|\}$ indicates the average value of the intensity difference vector. Making the mean of |R'| having the least value means to let an important symbol correspond to non deep fading as far as possible. Equation (4) can be vividly understood as having more important symbols to correspond to the non deep fading sub-carrier and also having more unimportant symbols to correspond to the deep fading sub-carrier through adjustment of the symbol order.

For a certain fixed fading pattern, the rearranging function $f(S, R)$ will produce a certain new order that satisfies the aforementioned principle. Here, it is possible that the different symbol orders will be mapped as an identical new order. Such mapping is stored in the transmitter in the form of a lookup table before each data transmission. FIG. 12 provides an embodiment for basic rearrangement of a lookup table.

FIG. 12 shows a generating method of a lookup table with the size of the subsets being 3, the number of the fading grades being 2, and the number of the symbol importance levels being 2. The symbols reference numbered as 1 are important symbols, and the shadow indicates deep fading. Firstly, all patterns (2*2*2=8 kinds) of the symbols to be arranged are sequentially numbered, for instance, as S(Symbol) 1301, and fading patterns (2*2*2=8 kinds) are then sequentially numbered, for instance, as F(Fading) 1302. 1303 refers to the lookup table. Column numbers are the numbers of the patterns of the symbols to be arranged, and row numbers are the numbers of the fading patterns. The combination of each column number and each row number corresponds to a rearrangement scheme 1304 of the symbols, i.e., a new symbol arrangement order, and all of these new orders are capable of minimizing the number of deep fading to which the important symbols correspond.

De-arrangement information from the transmitter is required to recover the original symbol order at the receiver side. The de-arrangement information must be sent to the receiving side, before transmission of data information, through reliable means (for instance, low speed-rate modulation encoding solution, and repetition, etc.). One feasible solution is to transmit as the header of the packet. FIG. 13 schematically shows a header for transmitting de-arrangement information. As shown in FIG. 13, the de-arrangement information consists of three character sections: an encoding block number 1301, a subset number 1302, and a rearrangement number 1303. The encoding block number 1301 indicates the encoding blocks corresponding to the information, the subset number 1302 indicates that the information corresponds to a specific subset of a certain encoding block, and the rearrangement number 1303 is the kernel content of the information, i.e., the de-arrangement solution—each number corresponds to a de-arrangement result. 1303 can be the number 1301 of the pattern of the transmitter's symbol to be arranged. The receiver recovers the order of the original symbols in accordance with this number.

Figure 5:
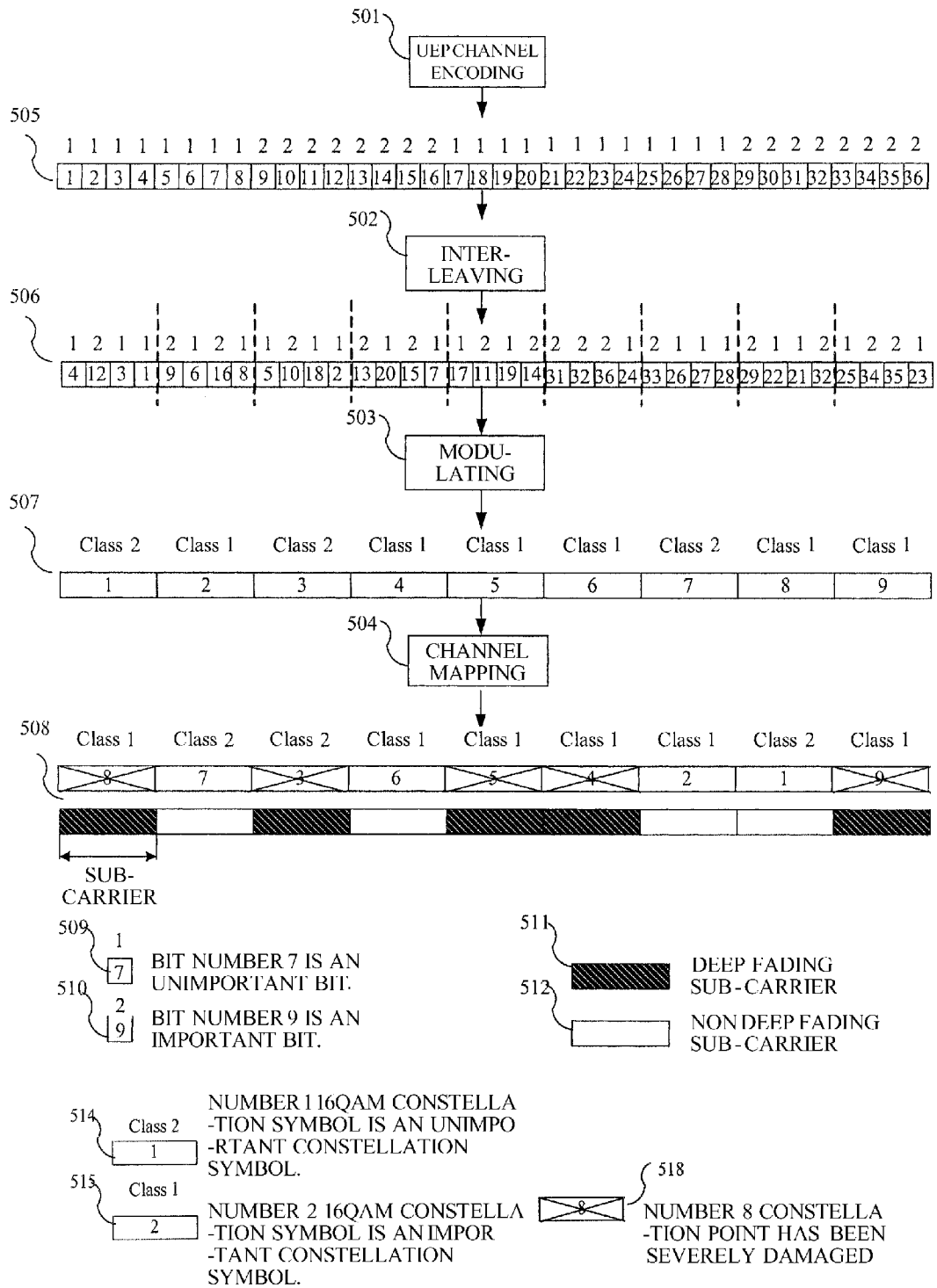
FIG. 5 is a schematic flowchart showing the channel encoding process at a conventional transmitter side.

FIG. 14 schematically shows the flow of the present invention. In comparison to FIG. 5, FIG. 14 more vividly illustrates the present invention. Therefore, the same parts as those shown in FIG. 5 are indicated by the same reference numerals, and detailed description thereto is omitted.

As shown in FIG. 14, the UEP channel code (namely the FEC code 505 in FIG. 14) is firstly inputted in Step 501. The FEC code 505 is firstly interleaved (in Step 502) by the bit interleaver 103 to obtain a bit-interleaved code 506. The bit-interleaved code 506 is then modulated by the modulator 104 (in Step 503) into 16 QAM constellation symbols 507. The constellation symbols 507 are performed with channel mapping (in Step 504) by the sub-carrier mapping unit 105 to obtain symbols 508 to be transmitted. As shown in FIG. 5a, there are altogether 10 important bits and 4 important symbols that suffer deep fading.

However, it is necessary to perform symbol classification (Step 520) in FIG. 14, and, after mapping, to perform symbol interleaving (Step 521) in accordance with the result of symbol classification and the feedback channel information.

As shown in FIG. 14, the symbols are divided into three subsets (there are 9 symbols in FIG. 14, so that each subset contains three symbols), and the symbols are respectively rearranged in these three subsets. It can be found that only two important symbols suffer deep fading, and this is a good result in comparison to the four important symbols that suffer deep fading in FIG. 5.

As should be noted, although the mapping result of the sub-carrier is always rearranged through symbol interleaving after the sub-carrier is mapped in the foregoing embodiments, it should be understood to those skilled in the art that the sub-carrier mapping unit can directly perform mapping in accordance with the feedback channel information and symbol classification information based on a certain function or lookup table, and the result of such mapping enables the important symbols to correspond to the non deep fading sub-carrier as much as possible, thereby dispensing with the need for rearrangement.

FIG. 15 schematically shows the signal processing procedure at the receiver side. The processing procedure in the receiver is opposed to and inversed with regard to the processing procedure in the transmitter, so that the processing in the receiver is described in this paper merely corresponding to the transmitter in FIG. 7d. The following description is made with reference to FIG. 6b. The symbol subset dividing unit 210 divides the received constellation symbols 1206 into several subsets with the number corresponding to the number of the subsets divided by the transmitter. Each subset contains N symbols. The symbol de-interleaver 211 performs de-interleaving (de-arrangement) with respect to each subset in accordance with the CSI pattern (namely through looking up a table) in Step 1201. The de-interleaved symbols 1207 are then de-mapped by the sub-carrier de-mapping unit 205 (in Step 1202), and the de-mapped symbols 1208 are demodulated by the demodulator 206 (in Step 1203). The demodulated bits 1209 are de-interleaved by the de-interleaver 207 (in Step 1204), and the de-interleaved bits 1210 are then decoded by the FEC decoder 208 (in Step 1205) and de-randomized by the de-randomizer 209.

Before application of the present invention, a precondition has to be ensured that the feedback channel state information (CSI) must be reliable enough. In other words, the channel fading pattern must be the same with regard to the transmitter and to the receiver, for otherwise the difference of the rearrangement scheme with regard to the transmitter and to the receiver would introduce great quantities of errors. Protective measures in three layers can ensure the reliability of the feedback information. Firstly, the number of the levels in each subset must be small, for it is only thus possible to ensure that the range of each level is big enough, and that small fading variation would not affect the pattern of the fading levels. Secondly, the feedback information itself can be transmitted in a more robust modulation and encoding mode. Thirdly, higher layer of protection mechanism, such as ARQ.

The aforementioned embodiments and examples are exemplary in nature rather than restrictive to the present invention. It is possible for those skilled in the art to make various modifications and variations to the embodiments of the present invention in accordance with the principles of the present invention, and all such modifications and variations shall fall within the scope of the present invention. The scope of the present invention is determined by the attached claims and analogues thereof.

For deeper understanding of the present invention, those skilled in the art may refer to the following documents, which are herein incorporated by reference as if they were completed enunciated herein.

1. US 2002/0066061 A1 Brain Classon et al.
2. Xiaowei Jin, Teng Li, Oliver M. Collins and Thomas E. Fuja, The Universality of LDPC Codes on Correlated Fading Channels with Decision Feedback Based Receiver, Global Telecommunications Conference, 2005. GLOBECOM apos; 05. IEEE Volume 3, Issue, 28 Nov.-2 Dec. 2005.
3. Shengli Zhou, and Baosheng Li, BER Criterion and Codebook Construction for Finite-Rate Precoded Spatial Multiplexing With Linear Receivers, IEEE TRANSACTIONS ON SIGNAL PROCESSING, VOL.54, NO.5, MAY 2006.
4. L. A. Dunning and W. E. Robbins: Optimal encoding of linear block codes for unequal error protection, Information and Control 37(1978), 150-177.
5. W. J van Gils: Two topics on linear unequal error protection codes: bounds on their length and cyclic code classes, IEEE Transactions on Information Theory 29 (1983), 866-876.

What we claim is:

1. A symbol interleaving and channel mapping device, used in a transmitter of a mobile communication system, said transmitter receiving the channel state information (CSI) fed back from a receiver of the mobile communication system; the symbol interleaving and channel mapping device comprising:
- a symbol classification unit for classifying symbols according to their importance;
- a symbol sub-carrier mapping unit for performing a sub-carrier mapping according to the CSI and the classification result of said symbol classification unit such that more important symbols correspond to the subcarriers with lower fading intensities.

2. The symbol interleaving and channel mapping device according to claim 1, wherein said symbol sub-carrier mapping unit comprising:
- a sub-carrier mapping unit for mapping said symbols to a sub-carrier;
- a symbol interleaving unit for adjusting the mapping result of said sub-carrier mapping unit according to the CSI and the classification result of said symbol classification unit, such that more important symbols correspond to the subcarriers with lower fading intensities.

3. The symbol interleaving and channel mapping device according to claim 2, further comprising a symbol interleaving necessity judging unit, wherein the symbol interleaving necessity judging unit judges whether it is necessary to adjust the mapping result of said sub-carrier mapping unit according to the conditions of said sub-carrier and the mapping result of said sub-carrier mapping unit.

4. The symbol interleaving and channel mapping device according to claim 2, wherein the sub-carrier is divided into a plurality of subsets in said CSI; the symbol interleaving and channel mapping device further comprises a symbol subset dividing unit, wherein the symbol subset dividing unit divides said symbols into a plurality of subsets in the same number as that of said sub-carrier; and said symbol interleaving unit adjusts the mapping result of said sub-carrier mapping unit in respect to the subsets of said symbols.

5. The symbol interleaving and channel mapping device according to claim 1, wherein said symbol classification unit further comprising:
- a bit importance determining unit for determining the importance for each of bits in a symbol;
- an important bit number determining unit for determining the number of important bits in said symbol;
- a symbol importance judging unit for judging the importance of said symbol according to the numbers of important bits in said symbol and classifying said symbol.

6. The symbol interleaving and channel mapping device according to claim 2, wherein said symbol interleaving unit rearranges the mapping result of said sub-carrier mapping unit by a lookup table according to said CSI and the classification result of said symbol classification unit.

7. The symbol interleaving and channel mapping device according to claim 2, wherein said symbol interleaving unit performs a rearrangement to minimum the absolute value of a difference between a symbol importance grade marking value and a respective channel fading intensity level corresponding to sub-carrier among the rearranged mapping results according to said CSI and the mapping result of said sub-carrier mapping unit, wherein said symbol importance grade marking value represents the importance of a symbol, wherein when the symbol importance is higher, said marking value is smaller, the channel state corresponding to the sub-carrier is poorer, and said fading intensity level is higher; or when the symbol importance is higher, said marking value is bigger, the channel state corresponding to the sub-carrier is poorer, and said fading intensity level is lower.

8. The symbol interleaving and channel mapping device according to claim 2, wherein said symbol interleaving channel mapping device further comprising:
- a sub-carrier subset dividing unit for dividing the sub-carrier into a plurality of subsets;
- a symbol subset dividing unit for dividing said symbols into a plurality of subsets in the same number as that of said sub-carrier;
- a symbol interleaving unit for adjusting the mapping result of said sub-carrier mapping unit in respect to the subsets of said symbols.

9. A symbol interleaving and channel mapping method, used in a transmitter of a mobile communication system, said transmitter receiving the channel state information (CSI) fed back from a receiver of the mobile communication system, said method comprising:
- classifying symbols according to their importance;
- mapping said symbols on a sub-carrier;
- adjusting the mapping result of said mapping according to the CSI and the classification result of said symbol classification such that more important symbols correspond to the subcarriers with lower fading intensities.

10. A mobile communication system comprising a receiver and a transmitter, wherein
- said transmitter includes a symbol interleaving and channel mapping device as described in claim 1, and transmits de-arrangement information to said receiver;
- said receiver includes a symbol sub-carrier de-mapping unit, which processes the received symbol in an inverse method to that of the symbol sub-carrier mapping unit according to said de-arrangement information, besides, said receiver feeds back the channel information to said transmitter.

* * * * *